United States Patent [19]

Miller et al.

[11] 4,416,474
[45] Nov. 22, 1983

[54] PIPE COUPLING

[76] Inventors: Robert F. Miller, 3368 Las Huertas Rd., Lafayette, Calif. 94549; Paul K. Davis, 1121 Bay St., Alameda, Calif. 94501

[21] Appl. No.: 224,080

[22] Filed: Jan. 12, 1981

[51] Int. Cl.³ .............................................. F16L 59/16
[52] U.S. Cl. ...................................... 285/47; 285/55; 285/322; 285/424
[58] Field of Search ...................... 285/DIG. 4, 47, 55, 285/424, 322, 243, 253, 34

[56] References Cited

U.S. PATENT DOCUMENTS

| | | | |
|---|---|---|---|
| 3,492,029 | 1/1970 | French et al. | 285/138 X |
| 3,850,453 | 11/1974 | Bentley | 285/138 X |
| 3,903,928 | 9/1975 | Fillans | 285/47 X |
| 4,019,761 | 4/1977 | Heidemann | 285/47 |

FOREIGN PATENT DOCUMENTS 2100952  7/1972  Fed. Rep. of Germany ... 285/DIG.4

*Primary Examiner*—Dave W. Arola
*Attorney, Agent, or Firm*—Ernest M. Anderson

[57] ABSTRACT

A section of corrugated pipe is provided having complementary bell and spigot end portions, the bell end portion being longitudinally segmented and having integrally formed flexible side wall strips connected to and projecting from a substantially cylindrical shroud. The spigot end portion of each section is receivable within the bell end portion, and an annular recess is formed in the exterior surface for receiving the side wall strips of another section when connected therewith. A plastic liner extends through each pipe section with sealing means provided to form a continuous, smooth inner conduit.

10 Claims, 4 Drawing Figures

PIPE COUPLING

SUMMARY OF THE INVENTION

This invention relates generally to pipe constructions and, more particularly, to a novel form of corrugated pipe section having complementary bell and spigot end portions. Although the use of bell and spigot coupling devices, including those forming an integral part of the pipe section, are known, a novel form of pipe construction is disclosed which may be manufactured by reforming conventional pipe or made during the process of original manufacture. The pipe coupling, as herein described, is particularly suitable for use on welded corrugated steel pipe, including those having inner plastic liners and foamed insulation. More conventional lockseam or riveted pipe construction is also feasible for this coupling arrangement.

A section of corrugated pipe is provided having complementary bell and spigot end portions, the bell end portion being longitudinally segmented and having integrally formed flexible side wall strips connected to and projecting from a substantially cylindrical shroud. The spigot end portion of each section is receivable within the bell end portion and an annular recess is formed in its exterior surface for receiving the side wall strips of another section when connected therewith.

One object of the present invention is to provide pipe sections having bell and spigot end portions integrally formed thereon that may be field connected more easily than with conventional coupling devices.

Another object is to provide pipe sections of the kind described that may be connected end to end and secured together by merely encircling the bell end portion of one pipe section with a band, cable, wire rope, etc. and contracting the specially formed side wall strips to engage with the annular recess formed in the spigot end portion of a second pipe section.

A still further object of the invention is to provide a pipe construction of the kind described including corrugated pipe sections having complementary bell and spigot end portions and a cylindrical plastic liner.

Other objects of this invention will become apparent in view of the following detailed description.

DESCRIPTION OF DRAWINGS

In the drawings forming a part of this application and in which like parts are identified by like reference numericals throughout the same.

DETAILED DESCRIPTION

Figure 1:
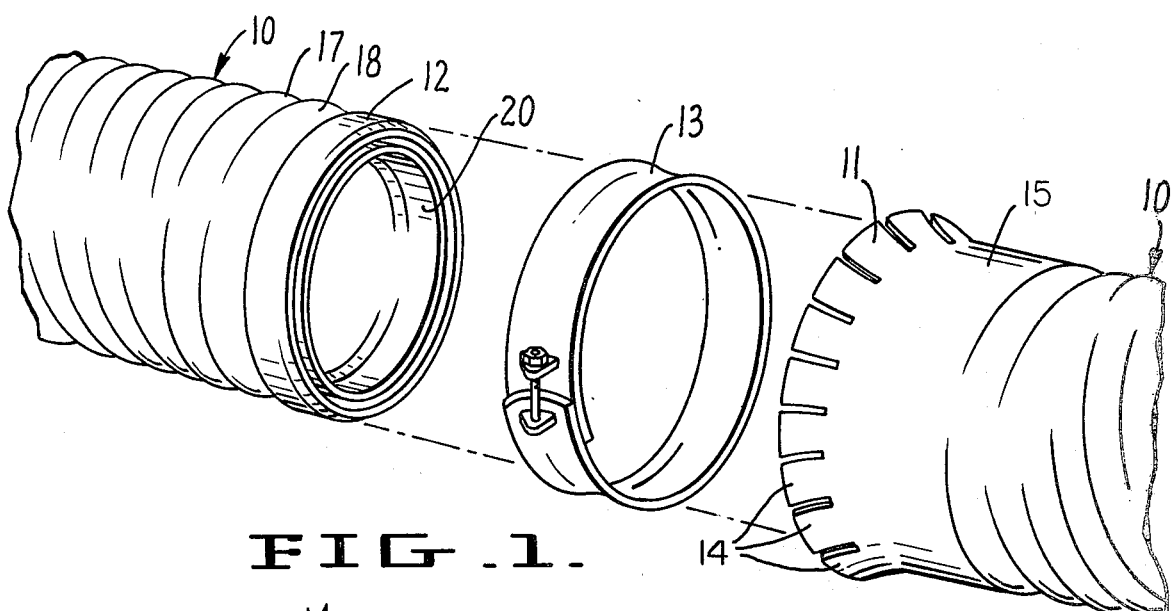
FIG. 1 is a perspective view of a preferred embodiment of the invention in a pipe construction and coupling comprising a pair of pipe sections having bell and spigot end portions.
Figure 2:
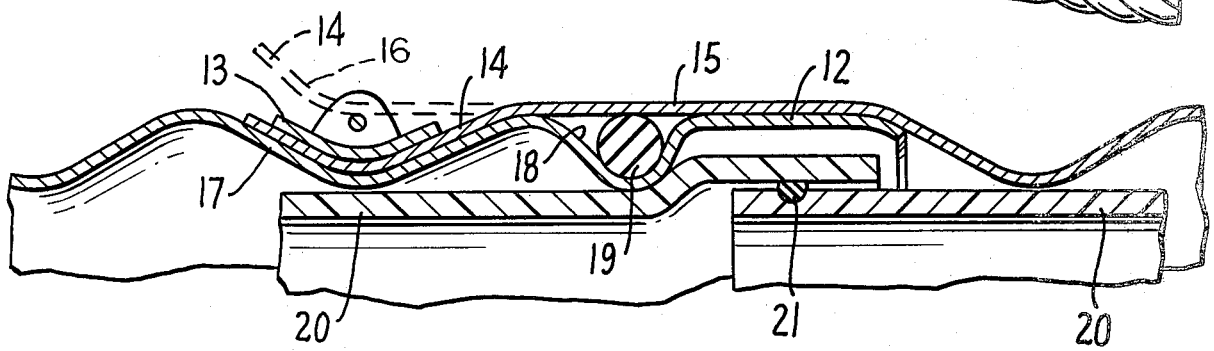
FIG. 2 is a longitudinal section through the coupled bell and spigot end portions of the pipe section shown in FIG. 1.

Referring to FIG. 1, there is illustrated a pair of corrugated pipe sections 10, each section formed with complementary bell and spigot end portions 11 and 12, respectively. Sections 10 are positioned in coaxial relation, the bell end portion of one section being positioned for coupling engagement with the spigot end portion of the other pipe section. The two pipe sections are adapted to be joined end to end by means of a circular band 13, which includes a means for tightening the band around the coupled end portions, as shown in FIG. 2.

The bell end portion 11 of each section 10 is longitudinally segmented, having integrally formed flexible side wall strips 14 connected to and projecting from a substantially cylindrical shroud 15. The spigot end portion 12 is formed of a diameter or size to be received within the bell end portion, the exterior surface of the spigot end portion defining an annular recess 17 located for radial engagement by the curved ends 16 of side wall strips 14 of a connecting pipe section. The curved ends, it will be seen, complement and correspond to the curvature of recess 17. A second annual recess 18 is also formed in the spigot end porton for receiving a resilient O-ring seal 19.

Band 13 is not unlike bands used previously for coupling pipe sections of prior art design. Moreover, various types of cables, wire ropes, rods and the like may be used to radially contract side wall strips 14 into engagement with recess 17.

In a preferred embodiment of the invention each pipe section is provided with a cylindrical plastic liner 20, both ends of the liner being fully housed within the bell and spigot end portions of the pipe. Thus, the liner itself is protected by the corrugated pipe during shipment. One end of the liner, as shown in FIG. 2, has an interior diameter greater than the exterior diameter at the other end, the length of the liner providing an overlapping fit when the bell end portion of one pipe section is fully coupled with the spigot end portion of another pipe section. The overlapped ends of two liners are sealed by an O-ring 21 disposed within a recess provided in one end of the liner.

Figure 3:
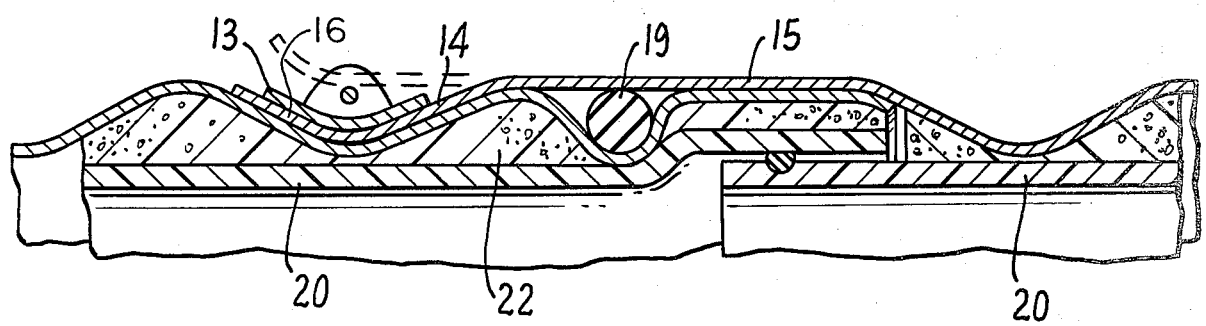
FIGS. 3 and 4 are longitudinal sections of two other embodiments of pipe constructions.

FIG. 3 illustrates a corrugated pipe section 10 in which the corrugations thereof are filled with any suitable filler material such as polyurethane or polystyrene foam 22. This foam secures the inner liner 20 to the inner walls of the corrugated pipe. The polyurethane may be foamed into the corrugations prior to installation of liner 20 but, preferably, it is introduced as a foamable mixture between the inner surface of the corrugated pipe and the exterior cylindrical surface of the liner during manufacture.

Figure 4:
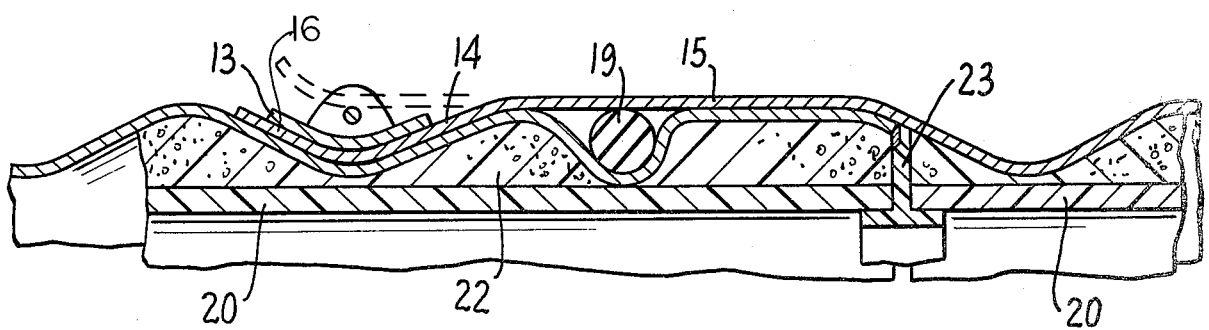

FIG. 4 illustrates a pipe section formed with a cylindrical liner having end sections which are of equal diameter. In this embodiment the length of each liner is dimensioned to be positioned in close adjacency or near abutment with the end of the liner of a second section when two sections are coupled. A sealing band 23 having a substantially T-shaped cross section is lodged between and overlapping the ends of the liners. The cross of the "T" forms a bridging seal, and the leg of the "T" provides an end seal between the ends of the two liners. Sealing bands having an "L" shaped cross section may also be used to provide bridging and end seals between liners.

Although several embodiments of the invention have been illustrated and described, various modifications and changes may be resorted to without departing from the spirit of the invention or the scope of the appended claims, and each of such modifications and changes is contemplated.

What is claimed is:

1. A section of currugated pipe having complementary bell and spigot end portions, and more particularly comprising:

a bell end portion longitudinally segmented to form a plurality of integrally formed flexible side wall strips connected to and projecting from a substantially cylindrical shroud, each of said side wall strips terminating in a curved end; and a spigot end portion receivable within said bell end portion, the exterior surface thereof defining a pair of axially spaced annular recesses and terminating in a cylindrical extension, one recess being located for radial engagement by the side wall strips of another section when connected therewith, the other recess being located axially between said one recess and said cylindrical extension for receiving a resilient O ring seal that contacts with the interior surface of the shroud of a bell end portion of another pipe section.

2. The pipe section of claim 1, and further comprising a substantially cylindrical liner extending through each pipe section, one end of said liner having an interior diameter greater than the exterior diameter of the other end of said liner, the length of said liners within each pipe section providing an overlapping fit when the bell end portion of one pipe section is fully mated with the spigot end portion of another pipe section.

3. The pipe section of claim 2, the further comprising an O-ring seal disposed between the overlapped end portions of the liners of two pipe sections when fully mated.

4. The pipe section of claim 2, and further comprising a foamed material joining said liner to the interior surface of said pipe section, including the spigot end portion thereof.

5. The pipe section of claim 1, said pipe section being corrugated and having a substantially cylindrical inner liner, said liner being joined to the pipe section with foamed material filling the corrugations between the internal surface of said pipe section and the outer surface of said liner.

6. The pipe section of claim 5, said liner extending longitudinally between the inner-most end of the shroud and the end of said spigot end portion, the ends of two liners being substantially coaxial and in close proximate relation when complementary bell and spigot end portions of two pipe sections are joined.

7. The pipe section of claim 6, and further comprising a sealing band having a substantially T-shaped cross section, the cross of the "T" forming a bridging seal and the leg of the "T" an end seal lodged between the ends of two liners of coupled pipe sections.

8. The pipe section of claim 1, the integrally formed flexible side wall members of each bell end portion having a curve that complements and corresponds with the annular recess for coupling one section to another.

9. A pipe construction formed of pipe sections, each pipe section having complementary bell and spigot end portions, and more particularly comprising:

the bell end portion of each section being longitudinally segmented and having integrally formed flexible side wall strips connected to and projecting from a substantially cylindrical shroud, the spigot end portion of each section being receivable within the bell end portion of another section, the exterior surface thereof defining a pair of axially spaced annular recesses and terminating in a cylindrical extension, one recess located within the shroud, the other recess located axially within the flexible side wall strips when the spigot end portion of one section is coupled to the bell end portion of another section; and means for encircling and radially flexing the side wall strips of each bell end portion to contract and engage with the other recess of each spigot end portion.

10. The pipe construction of claim 9, and further comprising a resilient O-ring seal lodged in the one recess of each spigot end portion and in contact with the interior surface of the shroud of the bell end portion of another pipe section.

* * * * *